UNITED STATES PATENT OFFICE.

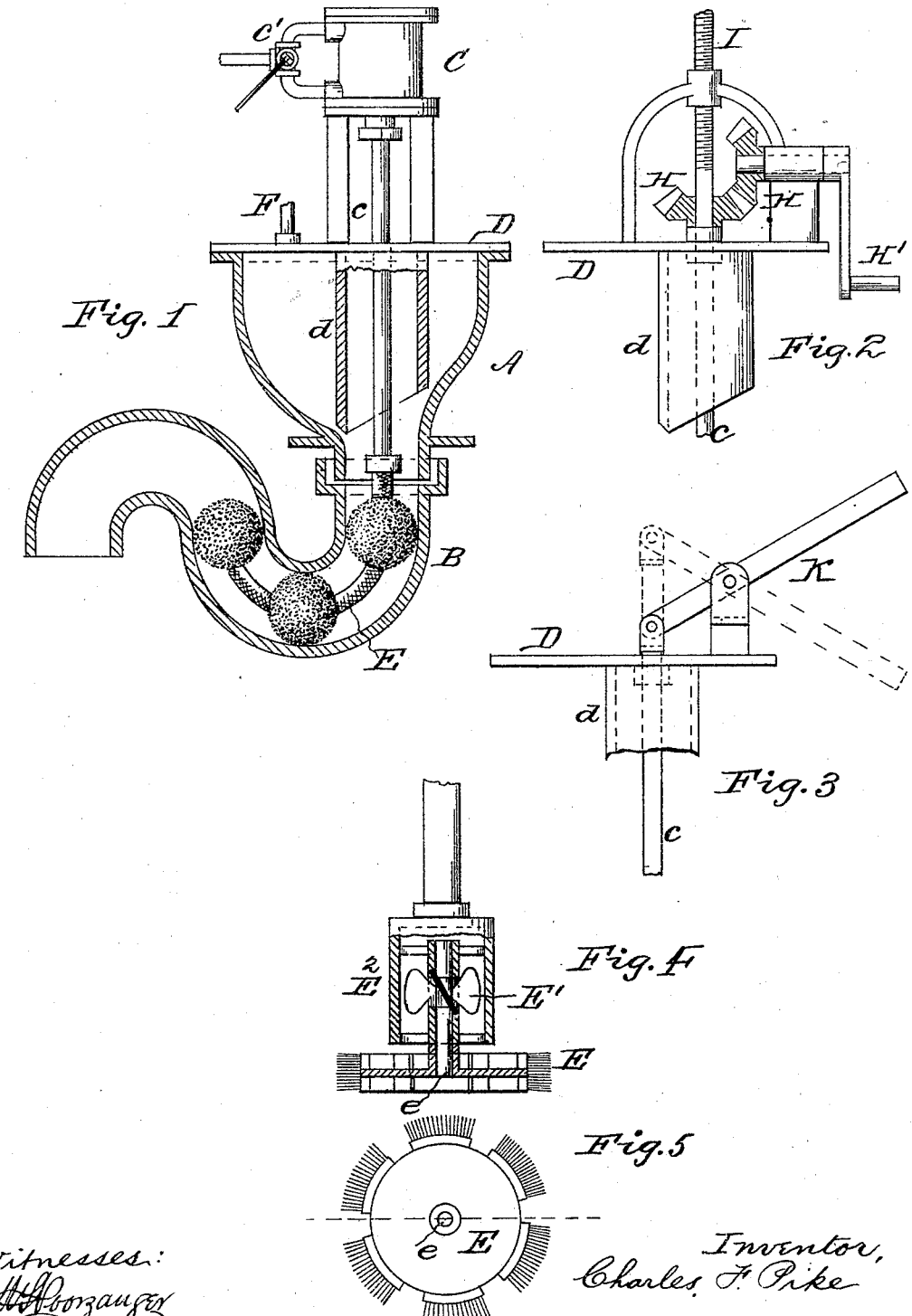

CHARLES F. PIKE, OF PHILADELPHIA, PENNSYLVANIA, ASSIGNOR TO THE NATIONAL ANTI-SEWER GAS COMPANY, OF CAMDEN, NEW JERSEY.

CLEANSING WATER-CLOSET AND OTHER TRAPS.

SPECIFICATION forming part of Letters Patent No. 271,358, dated January 30, 1883.

Application filed July 27, 1882. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Cleansing Water-Closet and other Traps, of which the following is a specification, reference being had therein to the accompanying drawings, wherein—

Figure 1 is a vertical section of a water-closet bowl and trap with my improved cleansing mechanism, shown in elevation, as applied thereto. Fig. 2 is an elevation, partly sectional, of a modification of operating mechanism. Fig. 3 is an elevation of still another modification of same. Fig. 4 is a section, partly in elevation, of a modification of mechanism for operating the cleansing-brush; and Fig. 5 is a plan of said brush.

My invention has relation to cleansing the traps of water-closets, wash-basins, soil-pipes, &c., and has for its object to provide a novel method of cleansing such fixtures without removing them from their fixed location.

My invention has for its further object to provide means for carrying my improved method into effect.

My improvements accordingly consist, first, in the provision of a brush adapted and designed to be inserted in the trap and be reciprocated or rotated therein, either manually or mechanically, to effect a thorough removal of all incrustations of fecal or other matter upon the sides or walls of the trap.

My improvements further consist of the provision of suitable mechanism for operating said brush, as hereinafter set forth.

Referring to the accompanying drawings, A represents a water-closet bowl, and B the trap therefor.

C represents a cylinder designed and adapted to be operated by compressed air or other suitable motive power. Said cylinder is supported in any suitable manner upon the plate D, which is intended to be placed upon the top of the bowl during the cleansing operations, as shown. Such plate not only forms a foundation for the support of attached mechanism, but also serves as a cover for the bowl to prevent water splashing therefrom while the trap is being cleansed. It also serves as a guide for the piston $c$, and has a depending tube, $d$, which acts as a guide to cause the brush E to enter the trap B; but such flange is not absolutely necessary for the purposes of my invention, hence I do not limit myself thereto. Such brush is designed to be made in the manner substantially as described in another application of even date herewith, and need not therefore be more particularly described. If desired, the plate D may have a water-pipe, F, attached thereto, as shown, which is designed to lead to a water-pipe or reservoir.

Said parts being arranged substantially as shown in Fig. 1, and the valve $c'$ of the cylinder C opened to admit air, steam, or other motive power to said cylinder, its piston is duly and rapidly reciprocated, carrying with it the brush E. The latter, impinging against the walls of the trap during such movement, removes any fecal or other matter adhering thereto. As said brush reciprocates water from pipe F is admitted to the bowl and the particles or dirt detached from the trap are washed out therefrom by such water and pass into the soil-pipe. When such cleansing operation is completed the plate D and attached mechanism are removed from the bowl, and the latter is again ready for use, its trap having been cleansed without disconnecting such parts.

If desired, the cylinder C and motive power therefor may be dispensed with and the gears H H and screw mechanism I shown in Fig. 2 may be substituted therefor. With such construction the brush not only reciprocates as the handle or crank H' is rotated in opposite directions, but is also rotated upon its axis, thus more rapidly and effectually performing its work; or, if desired, the hand-lever mechanism K' may be employed, as shown in Fig. 3.

In Fig. 4 I have shown a circular or disk-shaped brush secured to a shaft, $e$, having a propeller or water-wheel, E', attached thereto, and inclosed within a casing, $E^2$, provided with a supply-pipe, $E^3$. Such brush is designed to be placed within the trap, as above set forth, and water supplied to the propeller E' to cause it to rotate said brush. As the latter revolves the attendant or operator gradually reciprocates such brush within the trap, as and for the purpose set forth. I do not herein claim such modification specifically, as I reserve it for the subject of a future application. Hence it will be seen that no special form of operating mechanism is essential for carrying my improved method of cleansing water-closets into effect, as said mechanism may be greatly varied within the spirit of my invention.

What I claim as my invention is—

1. In cleansing water-closet traps, the method of removing their fecal incrustations without displacing the closet-bowl, which consists in passing a flexible tool through the bowl and inserting it into the trap, then applying power thereto to rapidly and continuously move the tool in impingement with such incrustations until their removal is effected, a stream or flow of water being admitted to said trap during such operation, substantially as set forth.

2. In cleansing water-closet and other traps of the adhering fecal matter, the method of removing such matter by attrition, which consists in reciprocating or rotating a flexible tool within the trap and introducing a stream or flow of water thereto during such operation, substantially as set forth.

3. In a device for cleansing the traps of water-closets and other traps, the combination of plate D, brush E, adapted to conform to the outline of the trap and rotate or reciprocate therein, mechanism for effecting such movement, and a water-supply pipe, F, substantially as shown and described.

In testimony whereof I affix my signature in presence of two witnesses.

CHARLES F. PIKE.

Witnesses:
CHAS. F. VAN HORN,
S. J. VAN STAVOREN.